US011599889B2

(12) United States Patent
Cox et al.

(10) Patent No.: US 11,599,889 B2
(45) Date of Patent: Mar. 7, 2023

(54) QUALIFICATION OF SECOND-SOURCE RAW MATERIALS IN THE PRESENCE OF MULTIPLE BATCH EFFECTS

(71) Applicant: The Boeing Company, Chicago, IL (US)

(72) Inventors: Kelsea Cox, Daniel Island, SC (US); Lindsay L. W. Jones, Madison, AL (US); Robert M. Lawton, Huntsville, AL (US); Emily O'Connor, Daniel Island, SC (US)

(73) Assignee: THE BOEING COMPANY, Chicago, IL (US)

( * ) Notice: Subject to any disclaimer, the term of this patent is extended or adjusted under 35 U.S.C. 154(b) by 530 days.

(21) Appl. No.: 16/672,841

(22) Filed: Nov. 4, 2019

(65) Prior Publication Data
US 2021/0133767 A1    May 6, 2021

(51) Int. Cl.
| | |
|---|---|
| *G06Q 30/00* | (2012.01) |
| *G06Q 30/018* | (2023.01) |
| *G06F 30/20* | (2020.01) |
| *G06F 111/10* | (2020.01) |

(52) U.S. Cl.
CPC ........... *G06Q 30/018* (2013.01); *G06F 30/20* (2020.01); *G06F 2111/10* (2020.01)

(58) Field of Classification Search
CPC .... G06Q 30/018; G06F 30/20; G06F 2111/10
See application file for complete search history.

(56) References Cited

U.S. PATENT DOCUMENTS

| | | |
|---|---|---|
| 10,928,801 B2 | 2/2021 | Jones et al. |
| 2014/0005981 A1 | 1/2014 | Loffler |
| 2016/0109879 A1* | 4/2016 | Dunlop .................. G01B 21/30 |
| | | 702/81 |
| 2018/0292811 A1 | 10/2018 | Baseman et al. |
| 2019/0271971 A1 | 9/2019 | Dunlop |

OTHER PUBLICATIONS

Robinson TJ, Wulff SS, Montgomery DC, Khuri AI. Robust parameter design using generalized linear mixed models. Journal of Quality Technology. Jan. 1, 2006;38(1):65-75. (Year: 2006).*

(Continued)

*Primary Examiner* — Chuen-Meei Gan
(74) *Attorney, Agent, or Firm* — MH2 Technology Law Group LLP

(57) ABSTRACT

Techniques for qualifying a candidate supplier are presented. Such techniques may include obtaining a part produced by a candidate supplier and measuring a quantifiable property in each of a plurality of samples to obtain an empirical data set. Such techniques may also include selecting, based on the empirical data set, and fitting to the empirical data set, an appropriate linear mixed model for the quantifiable property. Such techniques may further include computing an acceptance parameter from a mean and standard deviation obtained from the appropriate linear mixed model. The acceptance parameter may include a process capability index or a tolerance interval bound. Such techniques may further include determining that the candidate supplier qualifies based on comparing the acceptance parameter to a threshold.

20 Claims, 10 Drawing Sheets

(56) References Cited

OTHER PUBLICATIONS

Colosimo BM, Moroni G, Petró S. A tolerance interval based criterion for optimizing discrete point sampling strategies. Precision Engineering. Oct. 1, 2010;34(4):745-54. (Year: 2010).*
Joglekar, "Statistical Methods for Six Sigma in R&D and Manufacturing," John Wiley & Sons, Inc., 2003, 321 pages.
Scholz, "Tolerance Bounds and Cpk Confidence Bounds Under Batch Effects," published in Advances in Stochastic Models for Reliability, Quality and Safety, Chapter 24, Boston, 1998, pp. 1-18.
Author Unknown, "Item 16-20. Equivalency Testing Assuming a Change in Processing Has Occurred," MMPDS Item 16-20 30th MMPDS Meeting Agenda, 16-20_C9_Equivalency Testing Assuming a Change in Processing_30A.doc, 62 pages, year unknown.
Sharma et al., "One-Sided and Two-Sided Tolerance Intervals in General Mixed and Random Effects Models Using Small-Sample Asymptotics," Journal of the American Statistical Association, Mar. 2012, vol. 107, No. 497, Theory and Methods, 11 pages.
Scholz et al., "Tolerance Bounds and Cpk Confidence Bounds Under Batch Effects," Advances in Stochastic Models for Reliability, Quality and Safety, 1998, pp. 361-379.
Bolker et al., "GLMM FAQ," Oct. 5, 2022 (downloaded on Oct. 7, 2022 from https://bbolker.github.io/mixedmodels-misc/glmmFAQ.html), 62 pages.

\* cited by examiner

QUALIFICATION OF SECOND-SOURCE RAW MATERIALS IN THE PRESENCE OF MULTIPLE BATCH EFFECTS

FIELD

This disclosure relates to manufacturing, and more particularly to qualifying suppliers of manufactured parts.

BACKGROUND

The process to qualify a new supplier of manufactured parts used in an overall manufacturing process, or to re-qualify a supplier after substantial change in the parts manufacturing process, often varies within the industry. Recent focus has shifted the qualification process to include protection of allowables associated with material properties. In general, allowables requirements are statistically specified property values regarding manufactured parts, such as raw materials. The shift in ideology toward allowables has led the industry to attempt to develop methods to quantitatively demonstrate that allowables from a supplier's process meet predefined requirements. However, existing guidelines for qualifying or re-qualify a supplier, such as in Metallic Materials Properties Development and Standardization (MMPDS) documentation, *Metallic Materials Properties Development and Standardization (MMPDS)*—11, July 2016, do not account for batch effects.

Batch effects are an important aspect of manufacturing processes that are often overlooked. Batch effects occur when parts within a group are more similar to each other than they are to parts in other groups. Multiple batch effects are generated, for example, from the use of different chemical lots for material manufacturing, together with the processing of such materials in different heat treatments. That is, raw materials may be generated in batches with substantial between-batch variation, and the necessity of using multiple heat treatments to produce the material also constitutes a batch, again, with potentially substantial between-batch variation.

If batch effects are not properly accounted for, estimates of process variation will be incorrect. Incorrect variance estimates results in qualification of inadequate suppliers. If an inadequate supplier is qualified, the risk of escape for parts produced by the supplier is increased. Additionally, incorrect control charting leads to high false alarm rates and thereby increase testing and process monitoring costs. Therefore, it is important to properly account for batch effects for allowables determinations. Further, multiple batch effects are common in typical production processes.

Known techniques to qualify a process do not work in the presence of more than one batch effect. In particular, using known techniques in the presence of multiple batch effects can result in not only rejecting items and processes that are actually compliant, but also qualifying out-of-compliance items and processes, such that quality suffers.

SUMMARY

This disclosure comprises embodiments according to the following clauses.

Clause 1. A method including: obtaining at least one part produced by a candidate supplier using a bulk manufacturing process; measuring a quantifiable property in each of a plurality of samples of the at least one part to obtain an empirical data set; selecting an appropriate linear mixed model for the quantifiable property based on the empirical data set, where the selecting includes, for at least one ordering of variables corresponding to a plurality of batch effects including batch effects produced by the bulk manufacturing process, including in a linear mixed model variables from the at least one ordering of variables that significantly affect the quantifiable property; fitting, by at least one electronic processor, the appropriate linear mixed model to the empirical data set, where the linear mixed model provides a mean and a standard deviation of the quantifiable property for the at least one part based on the linear mixed model; computing, an acceptance parameter from the mean and the standard deviation, where the acceptance parameter includes at least one of a process capability index or a tolerance interval bound; and determining, by the at least one electronic processor, that the candidate supplier qualifies based on comparing the acceptance parameter to a threshold.

Clause 2. The method of Clause 1, where the acceptance parameter includes a process capability index computed with a specification limit corresponding to an allowable requirement, and where the threshold includes a process capability index requirement derived from the allowable requirement.

Clause 3. The method of any of Clauses 1 or 2, where the acceptance parameter includes a tolerance interval bound, where the tolerance interval bound includes a bound on a confidence that a selected proportion of the at least one part has respective values of the quantifiable property that meet a selected requirement.

Clause 4. The method of any of Clauses 1, 2 or 3, where the candidate supplier includes a previously qualified supplier.

Clause 5. The method of any of Clauses 1-4, where the selecting includes, for at least one ordering of variables corresponding to the plurality of batch effects, iteratively incorporating in the linear mixed model variables from the at least one ordering of variables that significantly affect the quantifiable property.

Clause 6. The method of any of Clauses 1-5, where the selecting includes, for each permutation of variables corresponding to the plurality of batch effects, iteratively incorporating in a respective linear mixed model variables from a respective permutation of variables that significantly affect the quantifiable property, such that a plurality of candidate models are produced; and selecting the appropriate model from among the plurality of candidate models.

Clause 7. The method of any of Clauses 1-6, where the threshold is met by a corresponding acceptance parameter of a previously qualified supplier.

Clause 8. The method of any of Clauses 1-7, further including incorporating the at least one part into an aircraft manufacturing process.

Clause 9. The method of any of Clauses 1-8, where the at least one part includes an amount of raw materials.

Clause 10. The method of any of clauses 1-9, where the plurality of batch effects further include batch effects produced by sampling the at least one part.

Clause 11. A system including at least one electronic processor that executes instructions to perform operations including: selecting a final linear mixed model for a quantifiable property of at least one part based on an empirical data set obtained by measuring the quantifiable property in each of a plurality of samples of the at least one part, where the at least one part is produced by a candidate supplier using a bulk manufacturing process, and where the selecting includes, for at least one ordering of variables corresponding to a plurality of batch effects including batch effects produced by the bulk manufacturing process, including in a linear mixed model variables from the at least one ordering of variables that significantly affect the quantifiable property; fitting the final linear mixed model to the empirical data set to obtain a fitted linear mixed model; extracting a mean and a standard deviation of the quantifiable property for the at least one part from the fitted linear mixed model; determining an acceptance parameter from the mean and the standard deviation, where the acceptance parameter includes at least one of a process capability index or a tolerance interval bound; and qualifying the candidate supplier based at least in part on comparing the acceptance parameter to a threshold.

Clause 12. The system of Clause 11, where the acceptance parameter includes a process capability index computed with a specification limit corresponding to an allowable requirement, and where the threshold includes a process capability index derived from the allowable requirement.

Clause 13. The system of Clause 11 or 12, where the acceptance parameter includes a tolerance interval bound, where the tolerance interval bound includes a bound on a confidence that a selected portion of the at least one part has respective values of the quantifiable property that meet a selected requirement.

Clause 14. The system of any of Clauses 11, 12, or 13, where the candidate supplier includes a previously qualified supplier.

Clause 15. The system of any of Clauses 11-14, where the selecting includes, for at least one ordering of variables corresponding to the plurality of batch effects, iteratively including in the linear mixed model variables from the at least one ordering of variables that significantly affect the quantifiable property.

Clause 16. The system of any of Clauses 11-15, where the selecting includes, for each permutation of variables corresponding to the plurality of batch effects, iteratively including in a respective linear mixed model variables from a respective permutation of variables that significantly affect the quantifiable property, such that a plurality of candidate models are produced; and selecting the final model from among the plurality of candidate models.

Clause 17. The system of any of Causes 11-16, where the threshold is met by a corresponding acceptance parameter of a previously qualified supplier.

Clause 18. The system of any of Clauses 11-17, where the at least one part is incorporated into an aircraft manufacturing process.

Clause 19. The system of any of Clauses 11-18, where the at least one part includes an amount of raw materials.

Clause 20. The system of any of Clauses 11-19, where the plurality of batch effects further include batch effects produced by sampling the at least one part.

Some embodiments provide a technical solution to the technical problem of qualifying a candidate supplier of parts, such as raw materials, when a plurality of batch effects are present in the parts. Without the disclosed techniques, batch effects can cause the variance of the process to be underestimated, which, in turn, can cause an inadequate and unqualified candidate supplier to be qualified. Embodiments provide a technical solution to this technical problem, as the disclosed components allow a computer system to operate as a special purpose computer system for determining whether a candidate supplier should be qualified as a supplier, while properly estimating variance in the presence of multiple batch effects.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
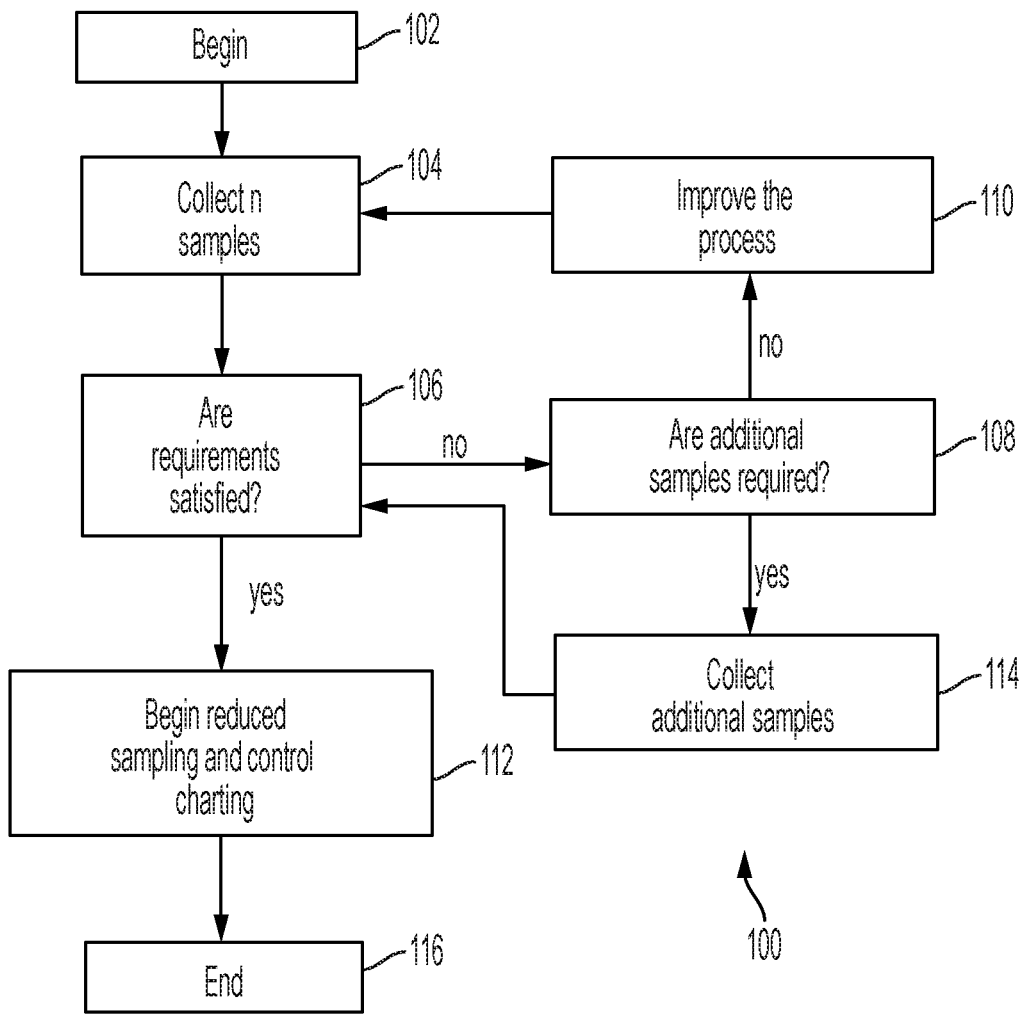
FIG. 1 is a flow diagram of a statistical process control technique.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples can be utilized and that changes can be made without departing from the scope of the disclosure. The following description is, therefore, merely exemplary.

I. Statistical Process Control and Allowables

Manufacturers of complex high-quality machinery such as aircraft typically require that their parts suppliers be qualified before being accepted as suppliers. Such qualification ensures that the parts meet the manufacturers' requirements in the form of criteria for statistical distributions of material properties. Often, such criteria include requirements for both central tendency and spread of the distribution. However, it is also common for these requirements to take the form of more complex distribution attributes. Specifically, A-basis and B-basis requirements are often used to ensure that no more than a specified percentage of the distribution will fall below a defined value. The A-basis requirement states that at least 99% of the distribution falls above a defined value with 95% confidence, and the B-basis requirements states that at least 90% of the distribution falls above a defined value with 95% confidence. These types of requirements are known as "allowables" because they allow up to a pre-specified percentage of the distribution to fall below a given value. Verification that the supplier meets these allowables requirements can be difficult, as narrow confidence intervals about quantiles require many samples. Once the supplier is qualified, then a sampling plan can be required for continued acceptance of the supplier's materials. (Note that embodiments are not limited to A-basis or B-basis values; quantiles other than 1%, 5%, 10%, 90%, 95%, or 99% can be used.)

Statistical process control traditionally begins with a requirement on the process capability index ($C_{pk}$) which provides a measure of the location and spread of the distribution with respect to specification limits. A high $C_{pk}$ indicates low fallout rates. For example, if the sample measurements follow a normal distribution, a $C_{pk}$ of one means that 99.7% of the distribution lies within a two-sided specification. A Cpk requirement is typically satisfied before a process enters the reduced sampling and control charting phase of statistical process control.

Thus, statistical process control implementation can greatly reduce testing costs for parts suppliers by reducing the number of specimens that are to be tested in each lot of materials that is delivered. Through adequate qualification and thorough monitoring of processes, the risk of escape, i.e., that an out-of-spec part is utilized, can be well controlled even though the number of parts that are actually tested is small. In order for the benefits of statistical process control to be realized and the risks to be properly managed, qualification and monitoring are carefully conducted by properly accounting for all relevant aspects of a process. In particular, reduced sampling can be implemented once the statistical process control requirements are met and the process is qualified.

FIG. 1 is a flow diagram 100 of a statistical process control technique, presented herein by way of background. Statistical process control is widely used throughout industry to monitor production processes through the use of statistical sampling and charting. The benefits of statistical process control include controlling the fallout rate of accepted material, early problem detection, and continuous process improvement. A successful approach ensures first-time quality by correctly rejecting suppliers that do not meet requirements, saves time and cost by correctly accepting suppliers that meet requirements, and protects buyers from risk of escapes while driving continuous improvement through process monitoring.

As shown in FIG. 1, a statistical process control technique can begin at block 102 with the collecting of a number n of samples at block 104 of a part used in, or produced by, a manufacturing process. The sampling can be of any quantifiable property, e.g., hardness, tensile strength, weight, length, etc. Initially, all specimens can be sampled, that is, n can equal the number of parts to be used or produced.

Next, at block 106, a determination is made as to whether the process qualifies for reduced sampling. Such qualification can be made through the use of a process capability index, denoted $C_{pk}$, which provides a measure of the quality of the process distribution with respect to specification limits, through a comparison to a process capability index requirement, denoted $C_{pk}^*$. A high process capability index is indicative of a low fallout rate. For example, a process capability index equal to one means that 99.7% of a distribution will fall within a two-sided specification under normality. In the absence of batch effects, the process capability index can be defined as follows.

$$C_{pk} = \min\left(\frac{USL - \hat{\mu}}{3\hat{\sigma}}, \frac{\hat{\mu} - LSL}{3\hat{\sigma}}\right) \quad (1)$$

In Equation (1), n is the sample size, $x_i$ is a quantifiable property of sample i, USL represents the upper specification limit, $\hat{\mu}$ is the sample mean $$\hat{\mu} = \frac{1}{n}\sum_{i=1}^{n} x_i,$$

and $\hat{\sigma}$ is the sample standard deviation, e.g., $$\hat{\sigma} = \sqrt{\frac{\sum_{i=1}^{n}(x_i - \hat{\mu})^2}{n-1}}.$$

To ensure that a process meets capability requirements, sampling error can be taken into account, and thus the requirement incorporates a confidence level. This requirement modification is dependent on sample size. For example, if the requirement states that the process is to produce a $C_{pk}$ of 1.0 with 90% confidence, then the process should provide a $C_{pk}$ of 1.30 with only 20 samples or a $C_{pk}$ of 1.15 with 60 samples. This modified $C_{pk}$ requirement is referred to as the process capability index requirement, denoted $C_{pk}^*$. The $C_{pk}^*$ value decreases (e.g., the requirement is relaxed) as sample size increases or confidence level decreases. Again in the absence of batch effects, the process capability index requirement can be determined as follows.

$$C_{pk}^* = \frac{1}{3\sqrt{n}} t_{n-1, C_0\sqrt{n}, 1-\alpha} \quad (2)$$

In Equation (2), n is the sample size, $\alpha$, is the Type I error rate associated with the confidence level of interest, $C_0$ represents the $C_{pk}$ requirement value, and $$t_{n-1, C_0\sqrt{n}, 1-\alpha}$$

represents a $(1-\alpha)$ quantile of a non-central t-distribution with n degrees of freedom and non-centrality parameter $C_0\sqrt{n}$.

If, on the one hand, the requirement is satisfied at block 106, i.e., if $C_{pk} \geq C_{pk}^*$, then, per block 112, reduced sampling and process monitoring through the use of control charts can be begin. This can continue until the manufacturing process ends, per block 116.

If, on the other hand, the requirement is not satisfied at block 106, i.e., if $C_{pk} < C_{pk}^*$, then, per block 108, a determination is made as to whether additional samples are required, e.g., if it is at the beginning of the manufacturing process. If so, then additional samples are collected per block 114, and control reverts to block 106. If not, then this is an indication of a flaw in the process or items, and per block 110, steps are taken to improve the manufacturing process or obtain in-compliance items. For example, the manufacturer can audit the manufacturing process, re-calibrate automated manufacturing machinery, or contact a supplier to request a replacement lot of items, if such items led to the out-of-compliance finding.

Thus, once a process meets the $C_{pk}^*$ requirement for the appropriate sample size per block 106, reduced sampling and control charting can optionally begin per block 112. Reduced sampling and control charting enables stakeholders to monitor the process without the cost associated with 100% inspection. Sampling plans typically account for the inherent sources of variation in the process. Control charts are used to monitor both trends in central tendency and trends in variation.

Some embodiments map $C_{pk}$ to a much larger defect rate than traditionally acceptable in industry. Such embodiments can allow a very large percentage of defects to fall below a lower bound ($C_{pl}$), to fall above an upper bound ($C_{pu}$), or to fall beyond the limits of both an upper and lower bound (e.g., $\min(C_{pl}, C_{pu})$). Note that process capability indices ($C_{pk}$) are traditionally used to control the percentage of defective parts and generally control this percentage very tightly to maintain quality control of products. Some embodiments utilize $C_{pk}$ technology to control tolerances of quality characteristics where a specific percentage of product samples are expected to fall outside of specification limits by the definition of the percentiles being examined. Such products can not be defective (e.g., not functional due to defects), but simply a part of the expected distribution.

Figure 2:
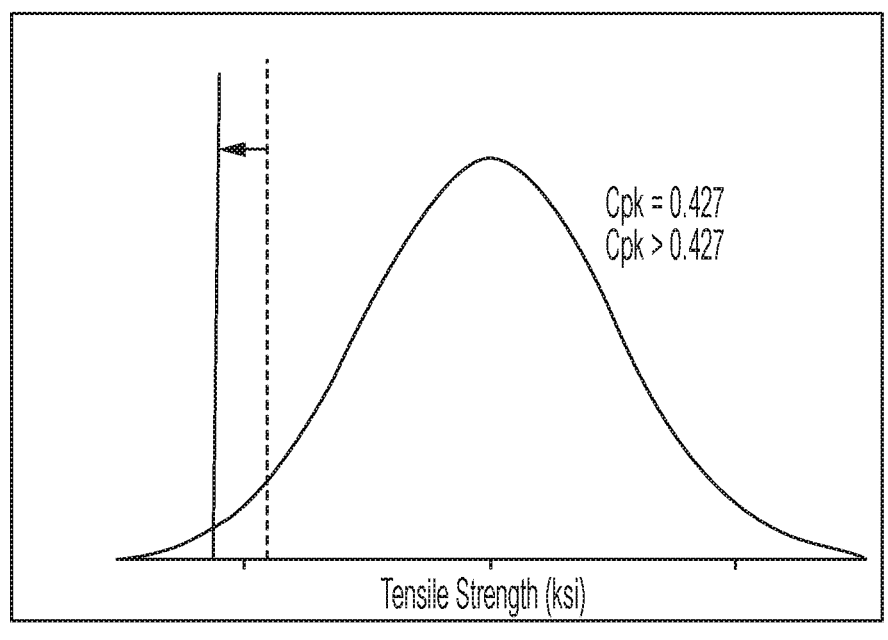
FIG. 2 depicts a graph illustrating a B-basis requirement according to one or more embodiments.

FIG. 2 depicts a graph illustrating a B-basis requirement according to one or more embodiments. As shown, the allowables B-basis requirement specifies that, with 95% confidence, no more that 10% of a distribution of a quantifiable property falls outside, that is, below, a specified limit.

Some embodiments provide for qualifying materials suppliers by merging allowables methodologies with modified statistical process control approaches. By framing the problem of supplier qualification in the language of statistical process control, some embodiments can benefit from the sound theory of standard industrial statistics, and also bring to bear the accompanying suite of monitoring methodologies, such as control charting.

II. Reconciling Statistical Process Control and Allowables

Disclosed herein is an approach for ensuring that materials meet allowables requirements without the risks associated with previously published approaches. Allowables requirements allow a percentage of the distribution to fall outside a specified interval, e.g., above or below specified limits. Some embodiments compute a process capability index ($C_{pk}$) utilizing the allowable requirement as a lower specification limit, thus providing a measure of the quality of the distribution with respect to the allowable specification. By definition, $$C_{pk} = \min\left(\frac{\mu - LSL}{3\sigma}, \frac{USL - \mu}{3\sigma}\right),$$

where LSL is the lower specification limit, USL is the upper specification limit, $\mu$ is the sample mean, and $\sigma$ is the sample standard deviation. As with traditional allowables, a 95% confidence level can be incorporated in order to account for sampling uncertainty. Under normality, the $C_{pk}$ associated with A-basis and B-basis values can be determined. In particular, for a specified allowable requirement of X % falling above a specified value, 1−X % can be input to an inverse normal distribution function, which outputs a corresponding process capability index $C_{pk}$. Alternately, the process capability index can be obtained by looking up the input value in a table. Thus, for example, a $C_{pk}$ of 0.775 maps to 99% of the distribution falling above a requirement (e.g., an A-basis). Similarly, a $C_{pk}$ of 0.427 maps to 90% of the distribution falling above a requirement (e.g., a B-basis).

In order to account for sampling uncertainty in $C_{pk}$ estimates, some embodiments define a process capability index requirement as $$C_{pk}^* = \frac{1}{3\sqrt{n}} t_{n-1, C_0 \sqrt{n}, 1-\alpha},$$

where n is the sample size, $\alpha$ is the Type I error rate associated with the confidence level of interest, $C_0$ represents the $C_{pk}$ requirement value, and $$t_{n-1, C_0 \sqrt{n}, 1-\alpha}$$

represents a (1−$\alpha$) quantile of a non-central t-distribution with n degrees of freedom and non-centrality parameter $C_0 \sqrt{n}$. The value of $C_{pk}^*$ increases as sample size decreases, ensuring 95% confidence in the $C_{pk}$ estimates given a finite sample size. That is, a less stringent requirement can be used when more samples are on hand. Examples of Cpk* requirements for one-sided specifications are found in the Table below.

TABLE

| Allowable | N | $C_0$ | $C_{pk}^*$ (95% confidence) | Corresponding Percentile |
|---|---|---|---|---|
| A-Basis | 30 | 0.775 | 1.021 | 1% |
| A-Basis | 50 | 0.775 | 0.954 | 1% |
| A-Basis | 70 | 0.775 | 0.921 | 1% |
| B-Basis | 30 | 0.427 | 0.592 | 10% |
| B-Basis | 50 | 0.427 | 0.546 | 10% |
| B-Basis | 70 | 0.427 | 0.527 | 10% |

This statistical process control approach for qualifying suppliers ensures that suppliers that meet requirements are qualified, and suppliers which do not meet requirements are not qualified. Not only does the statistical process control approach have these desirable features, but also, it can be shown that the statistical process control approach is mathematically equivalent to a direct comparison of an allowable to a requirement. In order to ensure the formal relationship between $C_{pk}$ and allowables, the following demonstrates that the probabilistic events associated with the definitions of the two formulations are equal in probability.

In what follows, $\bar{x}$ represents the sample mean, s represent the sample standard deviation, r represents the allowable requirement, K represents the K-factor, n represents the effective sample size, Cpk* represents the $C_{pk}$ requirement, $\alpha$ represents the significance level alpha (one minus the confidence level), q represents the percentile of the standard normal distribution, and qt(x, df, ncp) represents an x-th quantile of a non-central t-distribution with df degrees of freedom and ncp as the non-centrality parameter. Probabilities associated with allowables are evaluated below. The probability calculated in Equation (3) represents the probability that the allowable is greater than the requirement (e.g., the probability that a second source supplier will be accepted).

$$P(\text{allowable} = \bar{x} - Ks > r) = P\left(\bar{x} - \left[\frac{qt(1-\alpha, n-1, q\sqrt{n})}{\sqrt{n}}\right]s > r\right) \quad (3)$$

$$= P\left(\bar{x} - r > \left[\frac{qt(1-\alpha, n-1, q\sqrt{n})}{\sqrt{n}}\right]s\right)$$

$$= P\left(\frac{\bar{x}-r}{s} > \frac{1}{\sqrt{n}} qt(1-\alpha, n-1, q\sqrt{n})\right)$$

The probability of accepting a second source supplier using the Cpk method can be defined by the probability that the demonstrated Cpk value is greater than the Cpk requirement. As can be seen in (4), this probability is equivalent to the probability that the second source supplier would be accepted by comparing the allowable to the allowable requirement (3).

$$P\left(Cpk = \frac{\bar{x}-r}{3s} > Cpk^*\right) = P\left(\frac{\bar{x}-r}{3s} > \frac{1}{3\sqrt{n}} qt(1-\alpha, n-1, q\sqrt{n})\right) \quad (4)$$

$$= P\left(\frac{\bar{x}-r}{s} > \frac{1}{\sqrt{n}} qt(1-\alpha, n-L, q\sqrt{n})\right)$$

Note that Equations (3) and (4) do not address batching, a ubiquitous phenomenon in manufacturing in which items are grouped such that material from the same group are more similar to each other than they are to materials from other groups. These batch effects must be properly accounted for because raw materials are often tested in groups, where some groups share the same shape, chemistry, heat treatment, etc., while other groups differ with respect to these batching variables. The following Section describes the extension to the Cpk method to include accounting for these batching variables.

III. Reconciling Statistical Process Control and Allowables in the Presence of Multiple Batch Effects Incorrect variance estimates can ultimately result in qualification of inadequate suppliers. If an inadequate supplier is qualified, the designer of the product in which the part is used, such as an aircraft, can believe the material used in the design is stronger than the true material property, potentially increasing risk in safety and reliability. Therefore, it is important to properly account for batch effects in the qualification of parts such as raw materials. Existing methods, such as that disclosed in Scholz and Vangel, "*Tolerance Bounds and Cpk Confidence Bounds Under Batch Effects*," Advances in Stochastic Models for Reliability, Quality, and Safety, 1998, pp. 361-379, hereinafter, "Scholz and Vangel," are available for accounting for a single batch effect in the qualification of a process. However, more than one batch effect is common in typical production processes, and the extension of the existing methods to more complex batching structures is non-trivial. As an example of a more complex batching structure, raw materials can come in batches with substantial between batch variation, and materials can be produced in heat lot batches as well as batches of different chemistries. Further, sampling plans can produce batch effects, e.g., due to differing sampling methodologies used to obtain different samples. These and/or other batch effects can be accounted for using disclosed embodiments.

Figure 3:
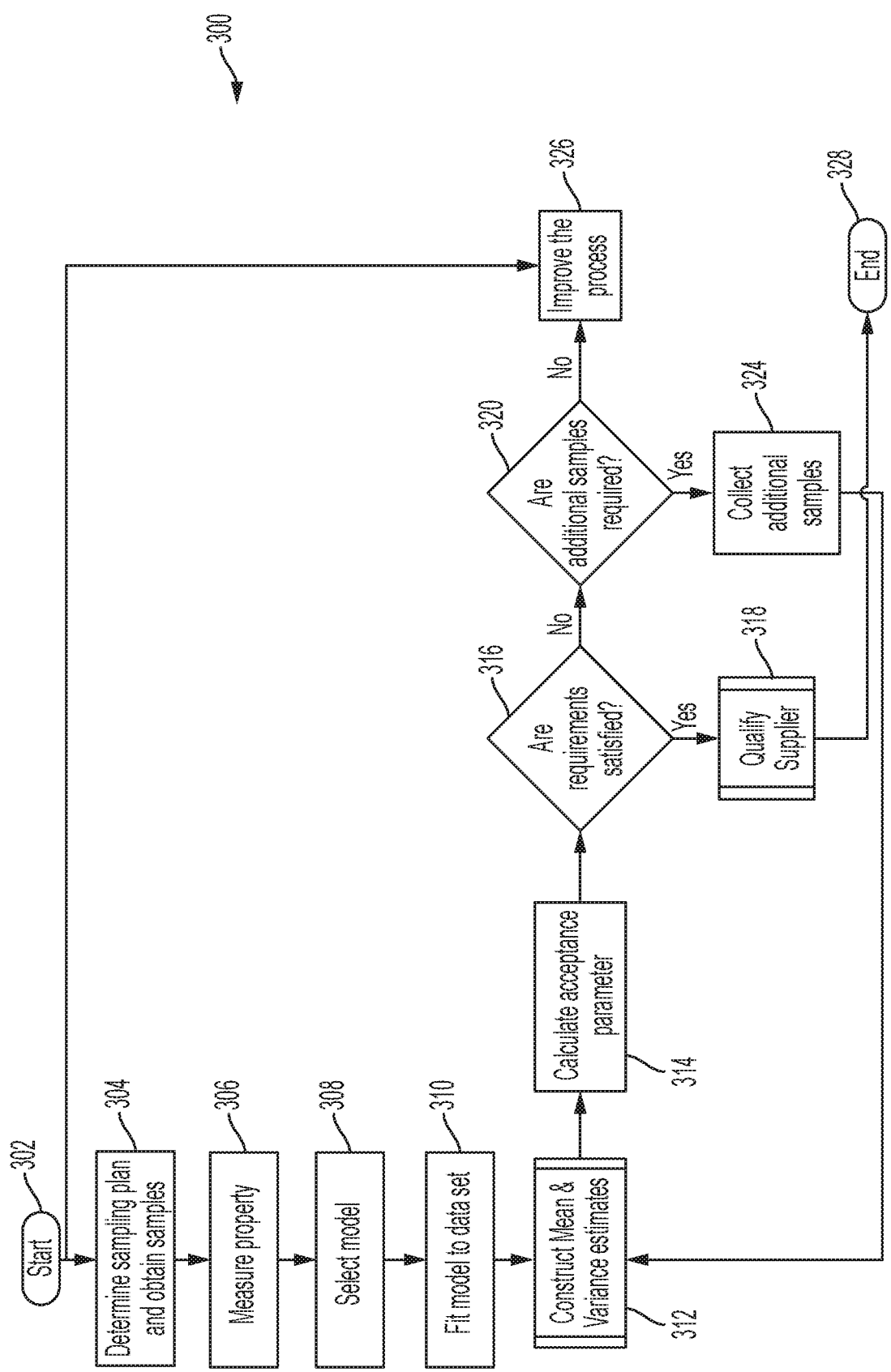
FIG. 3 is a flow diagram for a method of qualifying a secondary supplier according to one or more embodiments.

FIG. 3 is a flow diagram for a method 300 of qualifying a secondary supplier according to one or more embodiments. Method 300 can be implemented as presented herein, e.g., as shown and disclosed in reference to FIGS. 3-8.

At 302, method 300 can begin. Method 300 can begin when a candidate secondary supplier of parts, such as raw materials used in a manufacturing process for an overall product, is to be qualified. The parts can be any type of part that is subject to multiple batch effects. The batch effects can arise from manufacturing techniques and batches, or can arise from the sampling of 304, below. The overall manufacturing process can be for an airplane according to various embodiments. The candidate secondary supplier can have provided a lot of parts, or a sample of such a lot, at this stage. For example, the candidate secondary supplier can have provided one or more amounts of raw material, and/or samples taken therefrom.

At 304, a sampling plan is determined. The sampling plan can take into account that multiple batch effects are present, and can ensure that an adequate quantity of parts from each combination of batch effects are sampled. Nevertheless, the sampling itself can produce batch effects, e.g., due to different inspectors collecting samples, which can be accounted from according to method 300.

At 306, a quantifiable property of the sample of parts is measured. The quantifiable property can be any type of property, such as, by way of non-limiting example, hardness, tensile strength, weight, length, etc. The measurement can be performed using an appropriate measuring instrument and/or test bed.

At 308, a model is selected that accounts for the multiple batch effects. Techniques for selecting such a model are shown and described in detail below in reference to FIGS. 7 and 8.

At 310, the model is fitted to the data set that results from the sampling of 306. Standard fitting techniques can be used to fit the model selected at 308 to the data set obtained at 306.

At 312, mean and variance estimates are obtained from the fitted model of 310. Techniques for obtaining such estimates are shown and described in reference to FIG. 4.

At 314, an acceptance parameter is calculated. The acceptance parameter can be of various types according to various embodiments. According to some embodiments, the acceptance parameter is in the form of a process capability index, Cpk. Such embodiments are described particularly in reference to FIG. 5. According to some embodiments, the acceptance parameter is in the form of a tolerance interval. Such embodiments are described particularly in reference to FIG. 6.

At 316, a determination is made as to whether the requirement is satisfied, that is, whether the potential supplier is qualified. According to embodiments that utilize a process capability index for the acceptance parameter, the determination can be made by comparing the process capability index to a process capability index requirement as disclosed herein. According to embodiments that utilize a tolerance interval for the acceptance parameter, the determination can be made by comparing the tolerance interval to a requirement for the property measured at 306 as disclosed herein. If the requirement is satisfied, then control passes to 318, where the candidate secondary supplier is qualified as a secondary supplier. Otherwise, if the requirement is not satisfied, then control passes to block 320, where a determination is made as to whether additional samples are needed. If additional samples are needed, then control passes to 324, where additional samples are collected, and then back to 312. Otherwise, if additional samples are not needed, then control passes to 326, where the process is improved, and then back to 304.

Figure 4:
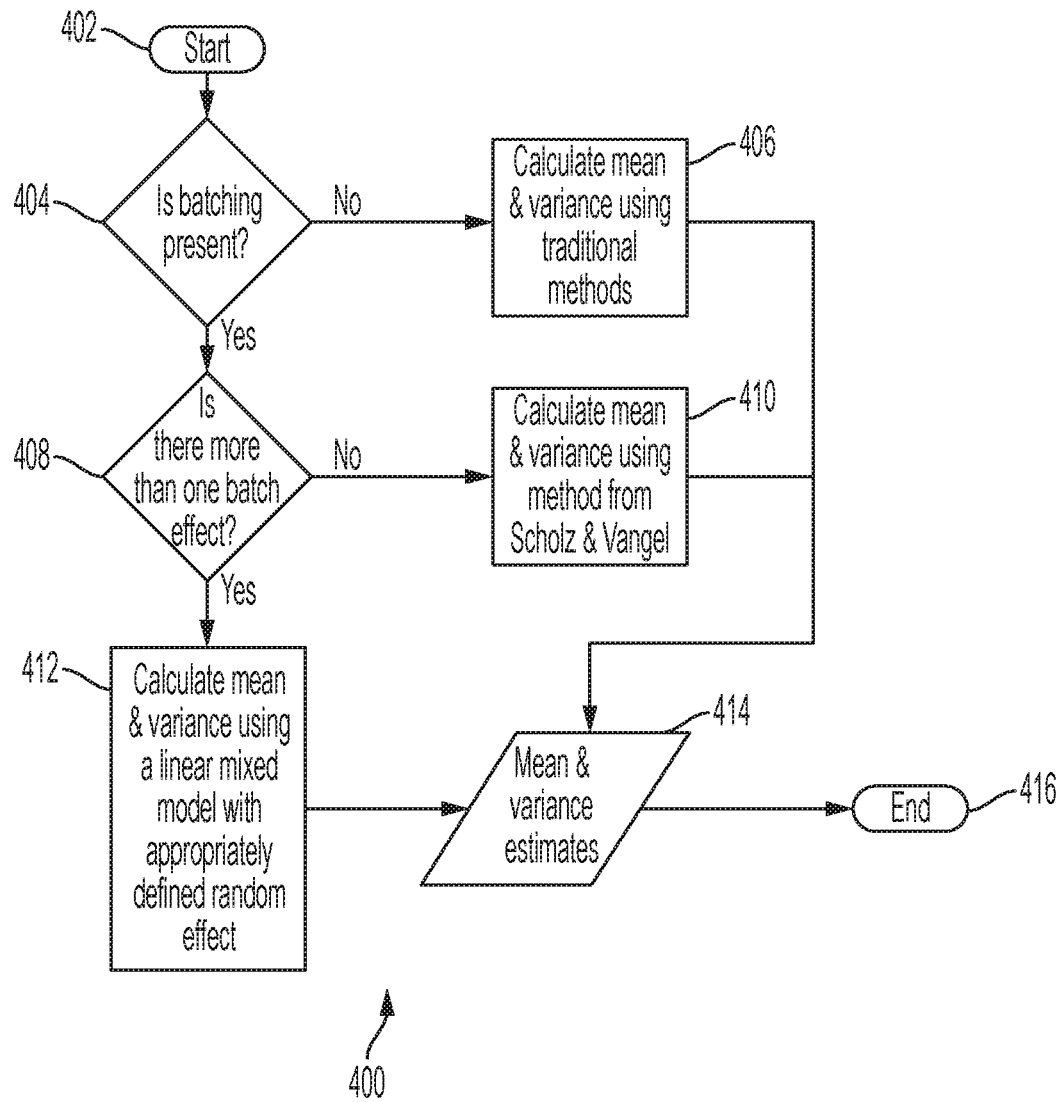
FIG. 4 is a flow diagram for a method of estimating a mean and variance using a linear mixed model according to one or more embodiments.

FIG. 4 is a flow diagram for a method 400 of estimating a mean and variance using a linear mixed model according to one or more embodiments. Method 400 can proceed in reference to a measurable quantity that has been sampled in a lot of parts. Method 400 is general in the sense that it can be applied in the absence of batch effects, in the presence of one batch effect, or, as utilized as part of method 300, in the presence of multiple batch effects.

At 402, method 400 can begin. Method 400 can be performed in reference to a candidate secondary supplier of parts that is to be qualified.

At 404, a determination is made as to whether any batch effects are present. If not, then control passes to 406, where the mean and variance 414 are calculated using traditional techniques, after which method 400 can end 416. If so, then control passes to 408.

At 408, a determination is made as to whether multiple batch effects are present. If not, then control passes to 410, where the mean and variance 414 are calculated using the techniques of Scholz and Vangel, after which method 400 can end 416. If so, then control passes to 412.

At 412, the mean and variance are determined by fitting a linear mixed model to the sampled data. Techniques for selecting such a linear mixed model in the presence of multiple batch effects are shown and described in reference to FIGS. 7 and 8. Once such a linear mixed model is selected and fitted, the mean and variance 414 can be extracted therefrom, after which method 400 can end 416.

Figure 6:
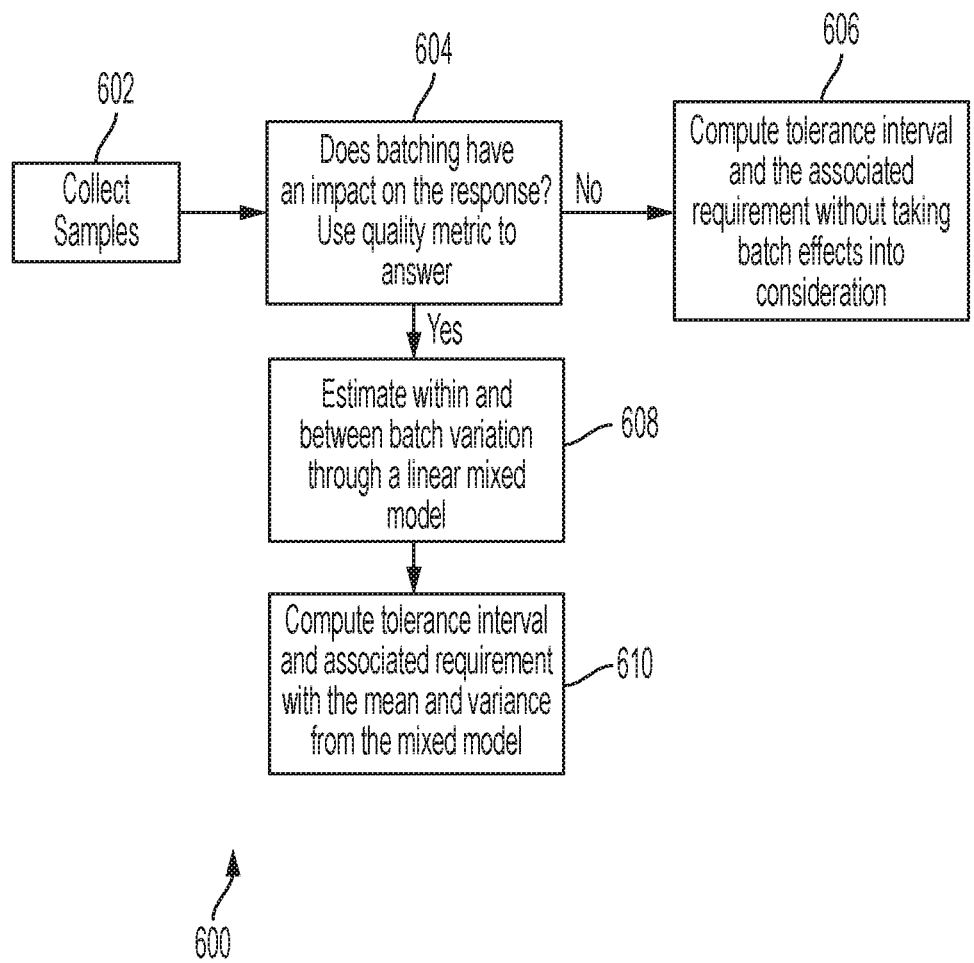
FIG. 6 is a flow diagram for a method of computing a tolerance interval according to one or more embodiments.
Figure 7:
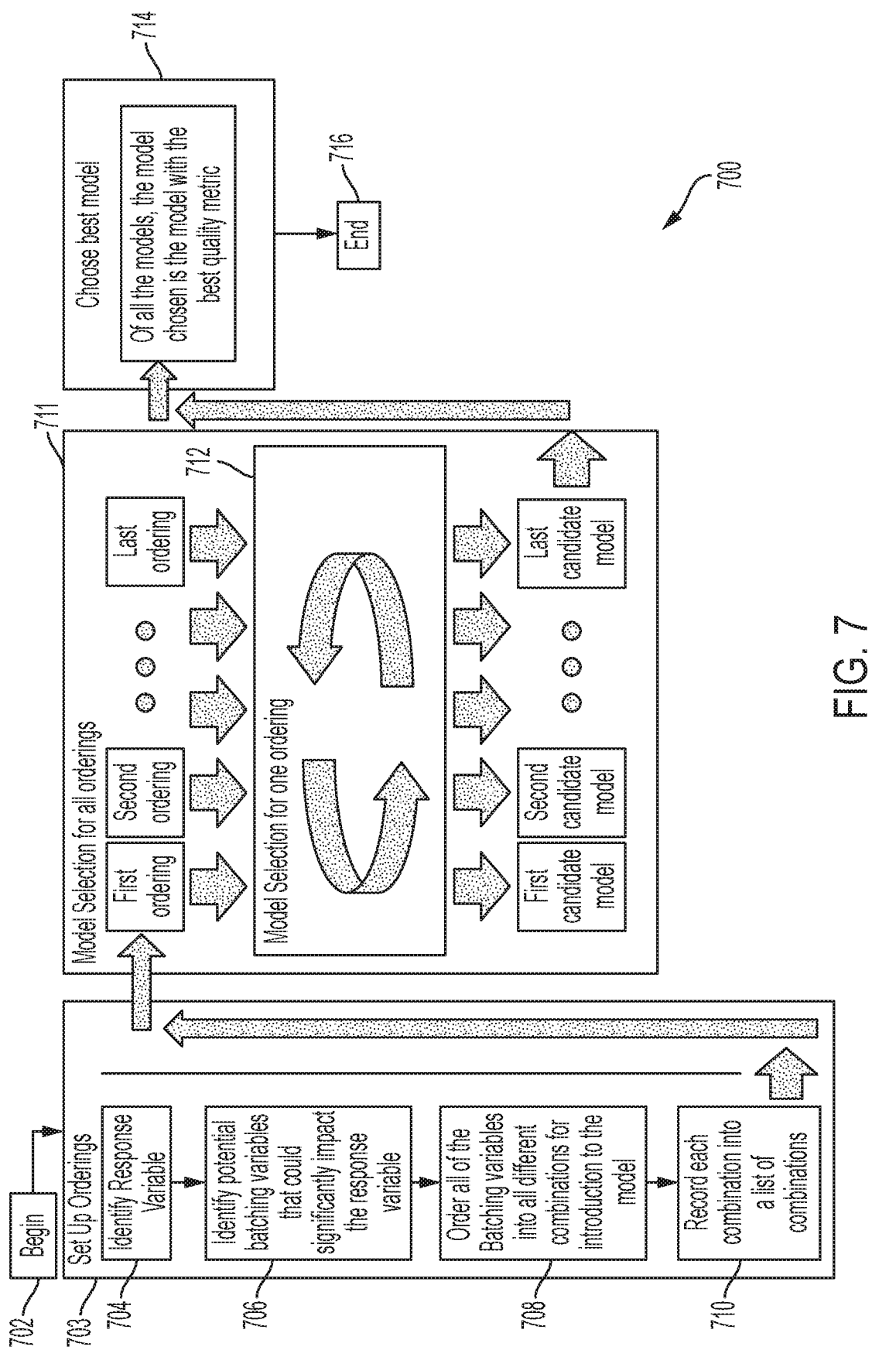
FIG. 7 is a schematic diagram for a method of selecting a linear mixed model according to one or more embodiments.
Figure 8:
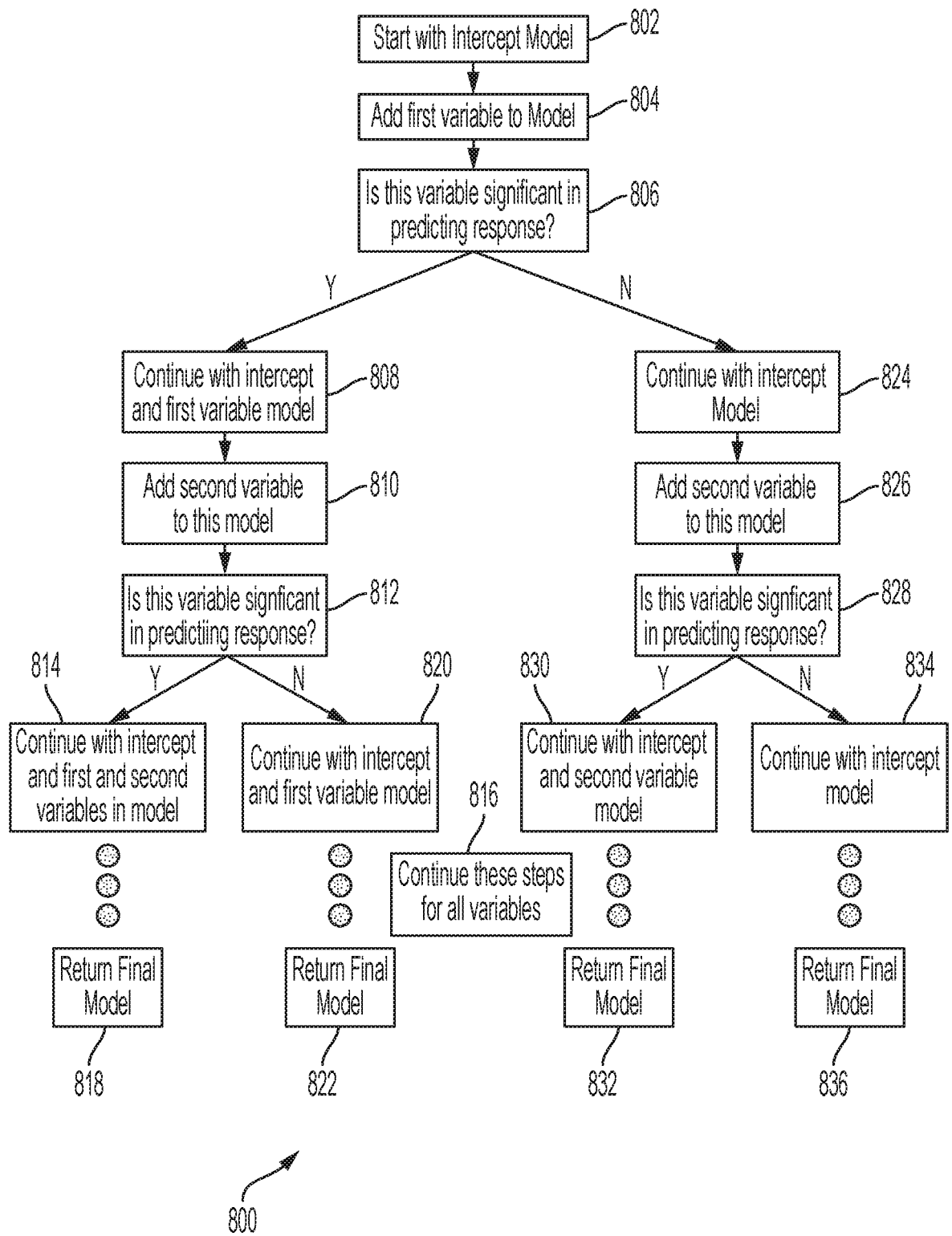
FIG. 8 is a schematic diagram for a method of selecting a mixed liner model for a particular ordering of variables corresponding to a plurality of batch effects.

Once a linear mixed model is selected using the techniques shown and described in reference to FIGS. 7 and 8, and once the mean and variance are estimated by extracting them from the fitted model, an acceptance parameter can be determined therefrom, as shown and described above in reference to FIG. 3. Techniques for determining a process capability index acceptance parameter are shown and described below in reference to FIG. 5. Techniques for determining a tolerance interval acceptance parameter are shown and described below in reference to FIG. 6.

Figure 5:
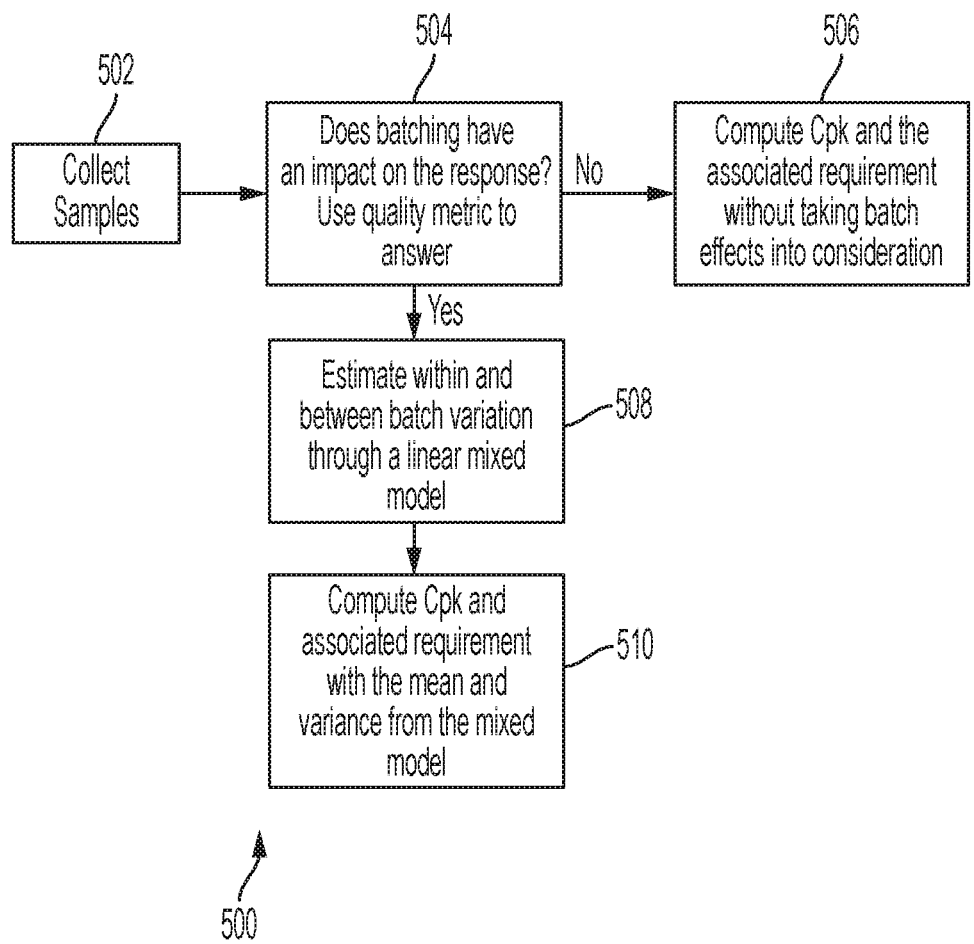
FIG. 5 is a flow diagram for a method of computing a process capability index and a process capability index requirement according to one or more embodiments.

FIG. 5 is a flow diagram for a method 500 of computing a process capability index and a process capability index requirement according to one or more embodiments. Such a process capability index can be a type of acceptance parameter, which can be compared with a process capability index requirement as a threshold, according to various embodiments.

At 502, samples are collected. For example, a measurement of a quantifiable property can be taken for a sample of a lot of parts.

At 504, a determination is made, or a plurality of determinations are made, as to whether various batching has an effect on the response. In order to properly account for batch effects, it is useful to understand if the batching significantly impacts the material property of interest. It is known how to test for the significance of random effects using a likelihood ratio test. See, e.g., bbolker.github.io/mixedmodels-misc/glmmFAQ.html#can-i-use-aic-for-mixed-models-how-do-i-count-the-number-of-degrees-of-freedom-for-a-random-effect. There, the author describes fitting full and reduced models and then testing if the expanded model is significant when compared to its nested counterpart. For example, tensile tests yield ultimate tensile strength (UTS) from raw materials which contain different shapes and chemistries. In order to determine which batch effects significantly impact UTS, an intercept model, a linear mixed model accounting for only shape, and a linear mixed model accounting for both shape and chemistry are fit. Then, the likelihood ratio test is applied to obtain insight as to which (if any) batch effects significantly impact UTS. This technique can be used so as to only account for batching variables that significantly impact the response. Note that the likelihood ratio test can be replaced by a variety of tests based on alternative metrics such as, by way of non-limiting examples, the Wald Test, the Score Test, the Akaike Information Criteria ("AIC") metric as disclosed in Akaike, H., *A new look at the statistical model identification*, IEEE Transactions on Automatic Control, 19 (6): 716-723 (1974), or Bayesian Information Criteria ("BIC"). A usage of a generalization of this technique for selecting an appropriate linear mixed model is shown and described in reference to FIGS. 7 and 8, below.

Once the model is selected and fitted to the data, a mean and variance can be extracted therefrom and used to compute $C_{pk}$ and $C_{pk}^*$.

If batching does not have an effect, then control passes to 506, where $C_{pk}$ and $Cpk^*$ are computed without taking batch effects into account. Otherwise, if batch effects have an impact on the response, then control passes to 508, where within and between batch variation is estimated using the linear mixed model, which can be selected as shown and described below in reference to FIGS. 7 and 8, and fitted to the data.

At 510, $C_{pk}$ and $C_{pk}^*$ are determined from the linear mixed model. The methods for calculating $C_{pk}$ and $C_{pk}^*$ described above in Section II are based upon the assumption of independent samples from a normal distribution. However, when batch effects are present, samples within a batch are correlated and are therefore no longer independent. If the variance or standard deviation of these samples is estimated without accounting for this lack of independence, the produced estimate will be incorrect. Because samples within a batch are typically positively correlated (samples within a batch are more similar to each other than to samples from other batches), the variance of the process will often be underestimated if traditional methods that do not account for batching are used. Underestimation of process variation can lead to overestimation of $C_{pk}$ and underestimation of $C_{pk}^*$, which means that an inadequate process could be qualified. Therefore, method 500 accounts for multiple batch effects, as described presently.

Thus, to calculate the proper variance components to determine $C_{pk}$ or $C_{pk}^*$, for example, some embodiments use the linear mixed model. Such a model for the case with two batch effects (one for mill heat of raw metal and one for heat treat lot of forged parts) can be expressed as, by way of non-limiting example:

$$y_{ijk} = a + h_j + m_k + e_{ijk} \quad (5)$$

In Equation (5), $y_{ijk}$ represents a quantifiable property of the i-th item in the j-th batch of a first batch effect and the k-th batch of a second batch effect, a represents a model intercept, $h_j$ represents the j-th batch of the first batch effect, $m_k$ represents the k-th batch of the second batch effect, and $e_{ijk}$ represents within-batch variation. In the model, $h \sim N(0, \sigma_1^2)$ is a first batch effect, $m \sim N(0, \sigma_2^2)$ is a second batch effect, and $e \sim N(0, \sigma_e^2)$ is an error term representing within-batch variation. For example, Equation (5) can be applied to multiple batch effects, in which case i represents an observation, j represents a heat treat lot, and k represents a mill heat.

Equation (5) can be generalized to account for any number of batch effects, by way of non-limiting example, as follows.

$$y_{ijk\ldots} = a + h_j + m_k + \ldots + e_{ijk\ldots} \quad (6)$$

In Equation (6), a formula for a linear mixed model for any number of batch effects, $y_{ijk}$ . . . represents a quantifiable property of the i-th item in the j-th batch of the first batch effect and the k-th batch of the second batch effect, with additional indices for additional batch effects, a represents a model intercept, $h_j$ represents the j-th batch of the first batch effect, $m_k$ represents the k-th batch of the second batch effect, " . . . " represents additional terms for additional batch effect variables, and $e_{ijk}$ . . . represents within-batch variation.

The linear mixed model of Equation (6) can be used to determine an estimated process capability index for two batch effects. Such an estimated process capability index for two batch effects can be expressed as follows, by way of non-limiting example:

$$C_{pk} = \min\left(\frac{USL - \hat{\mu}}{3(\widehat{\sigma_1^2 + \sigma_2^2 + \sigma_e^2})}, \frac{\hat{\mu} - LSL}{3(\widehat{\sigma_1^2 + \sigma_2^2 + \sigma_e^2})}\right) \quad (7)$$

In Equation (7), USL represents an upper specification limit, LSL represents a lower specification limit, $\hat{\mu}$ represents a mean of the quantifiable property, $\widehat{\sigma_1}$ represents a standard deviation of a first batch effect, $\widehat{\sigma_2}$ represents a standard deviation of a second batch effect, and $\widehat{\sigma_e}$ represents a standard deviation of an error term representing within-batch variation. The first term in the min function in Equation (7) is referred to as $C_{pu}$, and the second term is referred to as $C_{pl}$. Note that the denominators of the fractions in Equation (7) include a standard deviation calculation for two batch effects, which can be expressed as follows, by way of non-limiting example:

$$\hat{\sigma} = \sqrt{\widehat{\sigma_1^2} + \widehat{\sigma_2^2} + \widehat{\sigma_e^2}} \quad (8)$$

In Equation (8), as in Equation (7), $\widehat{\sigma_1}$ represents a standard deviation of a first batch effect, $\widehat{\sigma_2}$ represents a standard deviation of a second batch effect, and $\widehat{\sigma_e}$ represents a standard deviation of an error term representing within-batch variation. Equation (8) can be generalized for any number of batch effects, by way of non-limiting example, as follows:

$$\hat{\sigma} = \sqrt{\left(\sum_{i=1}^{B} \widehat{\sigma_i^2}\right) + \widehat{\sigma_e^2}} \quad (9)$$

In Equation (9), B is the number of batch effects, $\hat{\sigma}_i$ represents the standard deviation of batch effect i out of the plurality of B batch effects, and $\widehat{\sigma_e}$ represents a standard deviation of an error term representing within-batch variation.

Further, Equation (7) can be generalized to account for any number of batch effects, by way of non-limiting example, as follows.

$$C_{pk} = \min\left(\frac{USL - \hat{\mu}}{3\sqrt{\left(\sum_{i=1}^{B} \hat{\sigma}_i^2\right) + \hat{\sigma}_e^2}}, \frac{\hat{\mu} - LSL}{3\sqrt{\left(\sum_{i=1}^{B} \hat{\sigma}_i^2\right) + \hat{\sigma}_e^2}}\right) \quad (10)$$

In Equation (10), a general equation for a process capability index in the presence of two or more crossed batch effects, USL represents an upper specification limit, LSL represents a lower specification limit, $\hat{\mu}$ represents a mean of the quantifiable property, $\hat{\sigma}_i$ represent a standard deviation of batch effect i from the plurality of B batch effects, and $\widehat{\sigma_e}$ represents a standard deviation of an error term representing within-batch variation. As in Equation (7), the first term in the min function in Equation (10) is referred to as $C_{pu}$, and the second term is referred to as $C_{pl}$.

To use Equations (7) and (10) in the context of method 300, once an allowable requirement is selected, the corresponding value of the quantifiable property is selected for either LSL or USL. If the allowable requires the quantifiable property to not fall below a specified allowable percentile of the value with a given level of confidence, then LSL and $C_{pl}$ can be used, setting LSL to the property value corresponding to the allowable requirement and calculating $C_{pl}$. If the allowable requires the quantifiable property to not rise above a specified percentile of the allowable value, then USL and $C_{pu}$ can be used, setting USL to the property value corresponding to the allowable requirement and calculating $C_{pu}$. Note that upper and lower allowable requirements can be combined. For example, if the allowable requirement states that x % of the distribution must to fall between two values, then an embodiment can use $C_{pk} = \min(C_{pu}, C_{pl})$, as represented in Equations (7) and (10).

The linear mixed model of Equation (5) can be used to determine a process capability index requirement for two batch effects. To determine the appropriate value of $C_{pk}^*$ to use for two crossed batch effects, an effective sample size is first determined. For two batch effects, an effective sample size can be represented as, by way of non-limiting example:

$$n^* = \left(\frac{\widehat{\sigma_1^2} + \widehat{\sigma_2^2}}{\sigma_1^2 + \sigma_2^2 + \sigma_e^2} \sum_{i=1}^{k_1} \sum_{j=1}^{k_2} \left(\frac{n_{ij}}{n}\right)^2 + \frac{1}{n} \frac{\widehat{\sigma_e^2}}{\sigma_1^2 + \sigma_2^2 + \sigma_e^2}\right)^{-1} \quad (11)$$

In Equation (11), n* represents an effective sample size, n represents a total sample size, $k_1$ represents a number of batches in a first batch effect, $k_2$ represents a number of batches in a second batch effect, $\widehat{\sigma_1}$ represents a first standard deviation of the first batch effect, $\widehat{\sigma_2}$ represents a standard deviation of the second batch effect, $\widehat{\sigma_e}$ is an error term, that is, a standard deviation representing within-batch variation, and $n_{ij}$ represents a sample size of items in an i-th batch of the first batch effect and j-th batch of the second batch effect.

With the conventions of Equation (11) for an effective sample size, and with $t_{n^*-1, C_0\sqrt{n^*}, 1-\alpha}$ representing a $(1-\alpha)$ quantile of a non-central t-distribution with $n^*-1$ degrees of freedom and non-centrality parameter $C_0\sqrt{n^*}$, where $C_0$ is the $C_{pk}$ value corresponding to the allowable requirement (e.g., for an A-allowable, $C_{pk}$ can be selected as the inverse normal cumulative distribution function applied to 100%-99%=1%), and where $\alpha$ is a Type I error rate associated with a confidence level, a corresponding process capability index requirement can be represented, by way of non-limiting example, as follows:

$$C_{pk}^* = \sqrt{\frac{n-1}{n}} \frac{1}{3\sqrt{n^*-1}} t_{n^*-1, C_0\sqrt{n^*}, 1-\alpha} \quad (12)$$

Thus, the process capability index requirement is derived from the allowable requirement. Note that Equation (12) can be used for any number of batch effects by adjusting the formula for n*, e.g., by using all variance terms in the denominator and all batching-related (i.e., non-error) variance terms in the numerator of the term $$\frac{\sigma_1^2+\sigma_2^2}{\widehat{\sigma_1^2}+\widehat{\sigma_2^2}+\widehat{\sigma_e^2}},$$

extending the $$\sum_{i=1}^{k_1}\sum_{j=1}^{k_2}\left(\frac{n_{ij}}{n}\right)^2$$

term to sum over all batching variables (adding summations and indices as appropriate), and using all variance terms in the denominator of the term $$\frac{\sigma_e^2}{\widehat{\sigma_1^2}+\widehat{\sigma_2^2}+\widehat{\sigma_e^2}}.$$

Thus, a generalized formula for the effective batch size in the presence of any number of batch effects can be presented, by way of non-limiting example, as follows.

$$n^* = \left(\frac{\sum_{i=1}^{B}\sigma_i^2}{\left(\sum_{i=1}^{B}\widehat{\tau_i^2}\right)+\widehat{\sigma_e^2}}\Sigma_{j\in J}\left(\frac{n_j}{n}\right)^2 + \frac{1}{n}\frac{\widehat{\sigma_e^2}}{\sum_{i=1}^{B}\widehat{\sigma_i^2}+\widehat{\sigma_e^2}}\right)^{-1} \quad (13)$$

In Equation (13), B represents a number of batch effects, J represents a set of possible batch effect level combinations from all batch effects, $\hat{\sigma}_i$ represents a standard deviation for batch effect i, $\hat{\sigma}_e$ represents a standard deviation representing within-batch variation, $n_j$ represents a sample size of items in batch effect level combination j, and $$t_{n^*-1, C_0\sqrt{n^*}, 1-\alpha}$$

represents a $(1-\alpha)$ quantile of a non-central t-distribution with $n^*-1$ degrees of freedom and non-centrality parameter $C_0\sqrt{n^*}$, where $C_0$ is the $C_{pk}$ value corresponding to the allowable requirement at issue, and where $\alpha$ is a Type I error rate associated with a confidence level.

FIG. 6 is a flow diagram for a method 600 of computing a tolerance interval according to one or more embodiments. Such a tolerance interval can be a type of acceptance parameter, which can be compared with a value for the quantifiable property corresponding to the allowable requirement as a threshold, according to various embodiments.

At 602, samples are collected. For example, a measurement of a quantifiable property can be taken for a sample of a lot of parts.

At 604, a determination is made, or a plurality of determinations are made, as to whether various batching has an effect on the response. The actions of 604 are essentially identical to the actions of 504. If batching does not have an effect, then control passes to 606, where a tolerance interval is computed without taking batch effects into account. To that end, Equation (14) below can be used for calculating an A-basis (99-95 tolerance interval) or B-basis (90-95 tolerance interval) without taking batch effects into consideration and assuming the data is normally distributed.

$$\bar{x}-Ks \quad (14)$$

In Equation (14), $\bar{x}$ represents the sample mean, s represents the sample standard deviation, and K is an associated K factor.

Note that K factors can be computed using different distributional assumptions for x. For purposes of computing a tolerance interval in the absence of batch effects, K factors can be computed assuming x is normally distributed. For normal distributions, K factors are generated from a non-central t-distribution and are dependent on sample size. Without batch effects, the K factor can be substituted for the quantile of a non-central t-distribution as follows:

$$\bar{x}-Ks = \bar{x}-\left[\frac{qt(1-\alpha, n-1, q\sqrt{n})}{\sqrt{n}}\right]s \quad (15)$$

In Equation (15), $\alpha$ represents the significant alpha (i.e., 1-confidence level), q represents a percentile of the standard normal distribution, and qt(x, df, ncp) represents the x-th quantile of a non-central t-distribution with df degrees of freedom and non-centrality parameter ncp. In practice, K-factors can be generated using statistical software or through the use of a lookup table.

Otherwise, if batch effects do have an impact on the response per 604, then control passes to 608, where within and between batch variation is estimated using the linear mixed model. The actions of 608 are essentially identical to the actions of 508.

At 610, a tolerance interval and associated threshold are computed using the mean and variance of the linear mixed model. To that end, Equation (14) can be used, with the interpretations of $\bar{x}$ and s adjusted to account for batch effects as indicated presently. Note that variation typically occurs both within and between batches. When all variation occurs within batches (i.e., no between batch variation), then the variance is equal to a pooled variance. This means that all observations are independent, and the effective sample size (n*) is equal to the number of samples collected. When all variation occurs between batches (no variation within a batch), then the effective sample size (n*) is equal to the number of batches. In most situations where batch effects are present, the effective sample size (n*) is somewhere between these two extremes. Ignoring batch effects results in over-estimating sample size and underestimating variation.

Thus, to use Equation (14) in the presence of batch effects, the standard deviation of the data is no longer residual error alone. Instead, to determine the appropriate standard deviation, use the fitted linear mixed model to obtain variance estimates from the batching structure and residual error to estimate the variance (and standard deviation, s). Similarly, the mean ($\bar{x}$) for Equation (14) in the presence of batch effects is the intercept of the fitted model rather than the mean of the sample.

Note also that, in the presence of batch effects, the effective sample size of the distribution is no longer the sample size of data collected. Instead, the sample size of the data is decreased by a number which is informed by what percent of variation is due to batching versus residual error. This impacts the K factor, as the K factor is dependent on effective sample size.

FIG. 7 is a schematic diagram for a method 700 of selecting a linear mixed model according to one or more embodiments. Method 700 can be used in method 300 at 308, in method 400 at 412, in method 500 at 508, or in method 600 at 608.

Method 700 can begin at 702. At 702, a sub-process of setting up batching variable orderings is performed. Rather than fitting a final model only once by testing a series of batch effects one at a time by introducing them into an intercept only model, method 700 introduces batch effects one at a time to an intercept only model for each variable ordering defined at 702, potentially resulting in multiple models. (Alternately, this process can use a begin with all variables in the model and remove variables that are not significant one at a time. Still alternately, this process can be stepwise, that is, introducing variables iteratively, but allowing for removal of other terms that are no longer significant at each step of the process.) At 704, the response variable is identified. The response variable corresponds to the quantifiable property that is being analyzed for statistical compliance, e.g., with an allowable. At 706, potential batching variables are identified. Here, each batching variable corresponds to a potential batch effect. Thus, at 706, possible batching variables are identified. At 708, the batching variables are ordered according to all possible orderings of them. That is, at 708, all permutations of the batching variables are formed. In general, for B batching variables, there will be B! (i.e., B factorial) orderings. Accordingly, at 710, the orderings are recorded in an electronically stored list.

Next, method 700 performs model selection for all orderings at 711. Per 711, each ordering in the list of 710 is associated with a model using the techniques shown and described in reference to FIG. 8. The process of 711 thus results in B! candidate models, some of which can be duplicates.

At 714, a final model is selected from among the candidate models produced by 711. Any of a variety of techniques can be applied to select the final model. For example, a model quality metric can be employed. An example model quality metric is the AIC metric. Another example model quality metric is a Bayesian Information Criteria. The final model can be selected as the candidate model with the enhanced or optimal (e.g., greatest or smallest, depending in part on the metric used) model quality metric value.

At 716, method 700 can end.

FIG. 8 is a schematic diagram for a method 800 of selecting a mixed linear model for a particular ordering of variables corresponding to a plurality of batch effects. Method 800 can be employed per 711 of method 700 to obtain a possible final model associated with each ordering of batching variables. Method 800 is illustrated with respect to two batching variables. However, method 800 can be expanded as disclosed herein to accommodate any number of batching variables. Method 800 proceeds according to a specific ordering of the batching variables at issue. Starting with an intercept model, at each stage, method 800 iteratively incorporates the next batching variable from the specific ordering of batching variables that significantly affect the quantifiable property as represented by the response variable. Batching variables that do not significantly affect the quantifiable property are excluded.

Thus, at 802, method 800 starts with an intercept-only model, that is, a model without any batching variables. At 804, method 800 adds the first batching variable from the ordering at issue to the intercept model, and at 806, method 800 uses the likelihood ratio test to determine whether the first variable is significant in predicting the response variable. If so, then control passes to 808; otherwise, control passes to 824.

At 808, method 800 continues with the intercept model plus the first batching variable. Thus, at 810, the second batching variable is added to the intercept model that has been modified to include the first batching variable. At 810, the likelihood ratio test is applied to determine whether the second batching variable is significant in this model. If so, then control passes to 814, where method 800 continues 816 with the intercept model modified to include the first two batching variables, until all batching variables in the particular ordering have been analyzed. If not, then control passes to 820, where method 800 continues 816 with the intercept model modified to include the first batching variable, until all batching variables in the particular ordering have been analyzed.

At 824, method 800 continues with the intercept model. Thus, at 826, the second batching variable is added to the intercept model, and at 828, the likelihood ratio test is applied to determine whether the second batching variable is significant in this model. If so, then control passes to 830, where method 800 continues 816 with the intercept model modified to include the second batching variable, until all batching variables in the particular ordering have been analyzed. If not, then control passes to 834, where method 800 continues 816 with the intercept model, until all batching variables in the particular ordering have been analyzed.

Thus, at the end of method 800, having iteratively incorporated in a respective intercept model only those batching variables from the given permutation of batching variables that significantly affect the response variable, a candidate model is produced.

For each permutation of batching variables, method 800 provides a candidate model, and the candidate models can differ depending on the order of introduction of batching variables. Moreover, as more and more batching variables are introduced into the physical manufacturing system, the number of permutations to test increases rapidly, and there is a greater potential for differing models to be recommended from each batch effect introduction sequence. As disclosed above, per method 700, a final model is selected from among the candidate models based on a model quality metric, such as AIC.

Figure 9:
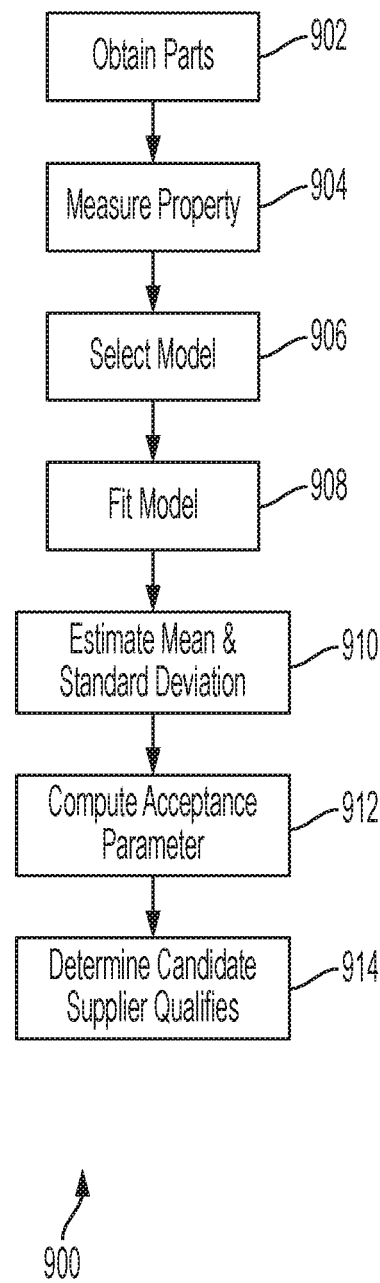
FIG. 9 is a flow chart for a method of qualifying a candidate supplier of parts manufactured by bulk manufacturing process in the presence of multiple batch effects according to one or more embodiments.

FIG. 9 is a flow chart for a method 900 of qualifying a candidate supplier of parts manufactured by bulk manufacturing process in the presence of multiple batch effects according to one or more embodiments.

At 902, method 900 obtains at least one part produced by a candidate supplier using a bulk manufacturing process. There can be one or more part, and each such part can be an amount of raw material according to some embodiments.

At 904, method 900 measures a quantifiable property in each of a plurality of samples from the at least one part to obtain an empirical data set. The actions of 902 can include those shown and described above in reference to FIG. 3, item 304.

At 906, method 900 selects an appropriate linear mixed model for the quantifiable property based on the empirical data set. The selecting can include, for at least one ordering of variables corresponding to a plurality of batch effects comprising batch effects produced by the bulk manufacturing process, iteratively including in a linear mixed model variables from the at least one ordering of variables that significantly affect the quantifiable property. The actions of 904 can include those shown and described in reference to FIG. 3, item 308, FIG. 7, and FIG. 8.

At 908, method 900 fits the appropriate linear mixed model to the empirical data set. The actions of 908 can include those shown and described above in reference to FIG. 3, item 310.

At 910, method 900 obtains a mean and a standard deviation of the quantifiable property for part(s) from the linear mixed model. The actions of 910 can include those shown and described above in reference to FIG. 3, reference 312, and FIG. 4.

At 912, method 900 computes an acceptance parameter from the mean and the standard deviation, where the acceptance parameter includes at least one of a process capability index or a tolerance interval bound. The actions of 912 can include those shown and described in reference to FIG. 3, item 314, FIG. 5, and FIG. 6.

At 914, method 900 determines that the candidate supplier qualifies, based on comparing the acceptance parameter to a threshold.

In the case that the acceptance parameter is a process capability index as described above in reference to FIG. 5, the threshold corresponds to the process capability index requirements described in reference to the same figure, and the comparison can include determining which quantity is greater. If the process capability index is at least as great as the process capability index requirement, then the candidate supplier qualifies according to some embodiments.

In the case that the acceptance parameter is a tolerance interval bound as described in reference to FIG. 6, the threshold corresponds to the desired value for the quantifiable property, and the comparison can include determining which quantity is greater. If the tolerance interval lower bound is at least as great as the desired value, then the candidate supplier qualifies according to some embodiments.

Figure 10:
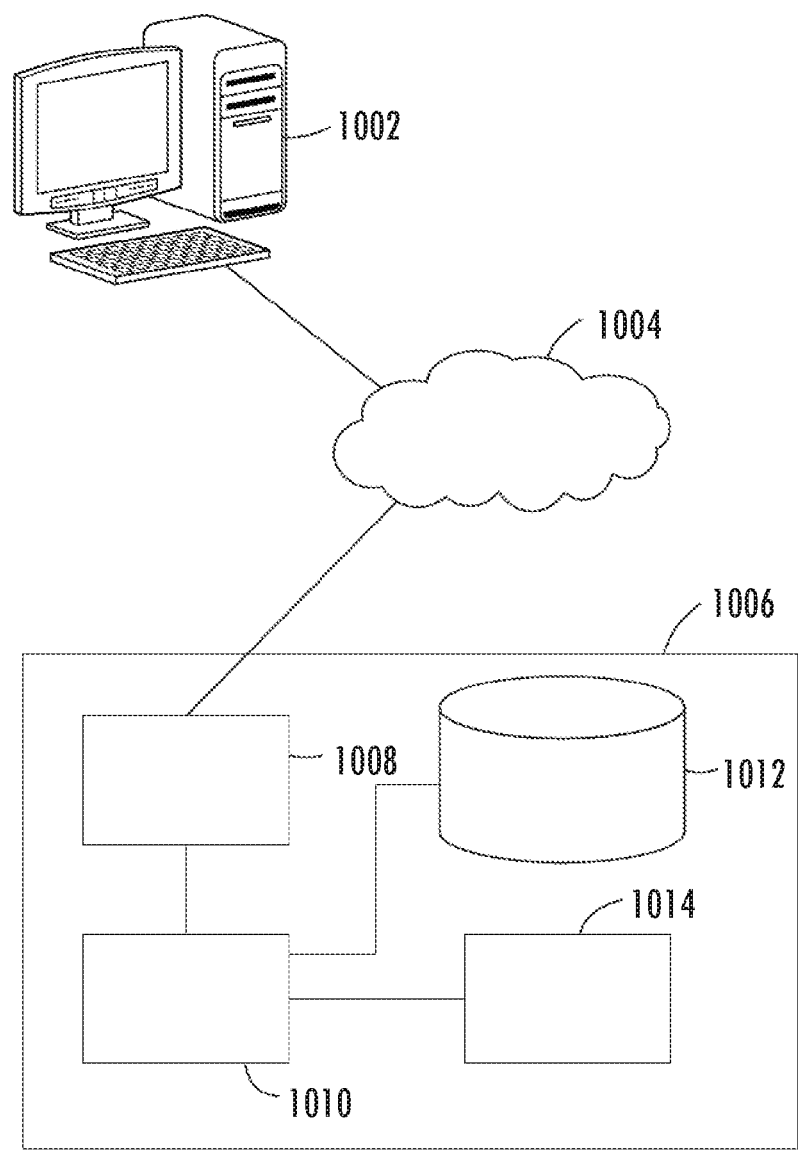
FIG. 10 is a schematic diagram of a computer system suitable for implementing various embodiments as disclosed herein.

FIG. 10 is a schematic diagram of a computer system 1006 suitable for implementing various embodiments as disclosed herein. In particular, FIG. 10 illustrates various hardware, software, and other resources that may be used in implementations of computer system 1006 according to disclosed systems and methods. In embodiments as shown, computer system 1006 may include one or more processors 1010 coupled to random access memory 1014 operating under control of or in conjunction with an operating system. The processors 1010 in embodiments may be included in one or more servers, clusters, or other computers or hardware resources, or may be implemented using cloud-based resources. The operating system may be, for example, a distribution of the Linux™ operating system, the Unix™ operating system, or other open-source or proprietary operating system or platform. Processors 1010 may communicate with persistent memory 1012, such as a hard drive or drive array, to access or store program instructions for performing any of the methods disclosed herein (e.g., any of methods 100, 300, 400, 500, 600, 700, 800 and/or 900) and/or other data. That is, processors 1010 may, in general, be programmed or configured to execute control logic and control operations to implement methods disclosed herein.

Computer system 1006 further includes interface 1008. As shown, interface 1008 includes a network interface, which may communicate via the one or more networks 1004, such as the Internet or other public or private networks, with client computer 1002, or other device or service. Client computer 1002 may be, e.g., a personal computer coupled to the internet. With interface 1008 as shown, a user may obtain an output qualification determination (e.g., qualified or not qualified) provided by computer system 1006 via network 1004 at client computer 1002. Such embodiments thus operate in a client-server arrangement. Alternately, interface 1008 may include a computer monitor, which displays an output qualification determination. Still alternatively, interface may be an audio interface, which may provide an output determination audibly. Other types of interfaces are possible for interface 1008.

Note that the disclosed methods, e.g., any of methods 100, 300, 400, 500, 600, 700, 800 and/or 900 (and components that perform these methods, e.g., computer system 1006) configure computer system 1006 to operate as a special purpose computer system.

The subject disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    obtaining at least one part produced by a candidate supplier using a bulk manufacturing process;
    measuring a quantifiable property in each of a plurality of samples of the at least one part to obtain an empirical data set;
    selecting an appropriate linear mixed model for the quantifiable property based on the empirical data set, wherein the selecting comprises, for at least one ordering of variables corresponding to a plurality of batch effects comprising batch effects produced by the bulk manufacturing process, including in a linear mixed model variables from the at least one ordering of variables that significantly affect the quantifiable property, and wherein the selecting further comprises, for a plurality of permutations of variables corresponding to the plurality of batch effects, iteratively incorporating in a respective linear mixed model variables from a respective permutation of variables that significantly affect the quantifiable property, whereby a plurality of candidate models are produced, wherein the appropriate model is selected among the plurality of candidate models;
    fitting, by at least one electronic processor, the appropriate linear mixed model to the empirical data set, wherein the linear mixed model provides a mean and a standard deviation of the quantifiable property for the at least one part based on the linear mixed model;
    computing an acceptance parameter from the mean and the standard deviation, wherein the acceptance parameter comprises at least one of a process capability index or a tolerance interval bound;
    determining, by the at least one electronic processor, that the candidate supplier qualifies based on comparing the acceptance parameter to a threshold; and
    incorporating the at least one part into an aircraft manufacturing process.

2. The method of claim 1, wherein the acceptance parameter comprises a process capability index computed with a specification limit corresponding to an allowable requirement, and wherein the threshold comprises a process capability index requirement derived from the allowable requirement.

3. The method of claim 1, wherein the acceptance parameter comprises a tolerance interval bound, wherein the tolerance interval bound comprises a bound on a confidence that a proportion of the at least one part has respective values of the quantifiable property that meet a requirement.

4. The method of claim 1, wherein the candidate supplier comprises a previously qualified supplier.

5. The method of claim 1, wherein the selecting comprises, for at least one ordering of variables corresponding to the plurality of batch effects, iteratively incorporating in the linear mixed model variables from the at least one ordering of variables that significantly affect the quantifiable property.

6. The method of claim 1, wherein the threshold is met by a corresponding acceptance parameter of a previously qualified supplier.

7. The method of claim 1, wherein the at least one part comprises an amount of raw materials.

8. The method of claim 1, wherein the plurality of batch effects further comprise batch effects produced by sampling the at least one part.

9. The method of claim 1, wherein the plurality of batch effects comprise: mill heat and heat treat lot.

10. The method of claim 1, wherein the quantifiable property comprises one of: hardness, tensile strength, weight, or dimension.

11. A system comprising at least one electronic processor that executes instructions to perform operations comprising:
    selecting a final linear mixed model for a quantifiable property of at least one part based on an empirical data set obtained by measuring the quantifiable property in each of a plurality of samples of the at least one part, wherein the at least one part is produced by a candidate supplier using a bulk manufacturing process, and wherein the selecting comprises, for at least one ordering of variables corresponding to a plurality of batch effects comprising batch effects produced by the bulk manufacturing process, including in a linear mixed model variables from the at least one ordering of variables that significantly affect the quantifiable property, and wherein the selecting further comprises, for a plurality of permutations of variables corresponding to the plurality of batch effects, iteratively incorporating in a respective linear mixed model variables from a respective permutation of variables that significantly affect the quantifiable property, whereby a plurality of candidate models are produced, wherein the final model is selected among the plurality of candidate models;
    fitting the final linear mixed model to the empirical data set to obtain a fitted linear mixed model;
    extracting a mean and a standard deviation of the quantifiable property for the at least one part from the fitted linear mixed model;
    determining an acceptance parameter from the mean and the standard deviation, wherein the acceptance parameter comprises at least one of a process capability index or a tolerance interval bound; and qualifying the candidate supplier based at least in part on comparing the acceptance parameter to a threshold, wherein the at least one part is incorporated into an aircraft manufacturing process.

12. The system of claim 11, wherein the acceptance parameter comprises a process capability index computed with a specification limit corresponding to an allowable requirement, and wherein the threshold comprises a process capability index derived from the allowable requirement.

13. The system of claim 11, wherein the acceptance parameter comprises a tolerance interval bound, wherein the tolerance interval bound comprises a bound on a confidence that a portion of the at least one part has respective values of the quantifiable property that meet a requirement.

14. The system of claim 11, wherein the candidate supplier comprises a previously qualified supplier.

15. The system of claim 11, wherein the selecting comprises, for at least one ordering of variables corresponding to the plurality of batch effects, iteratively including in the linear mixed model variables from the at least one ordering of variables that significantly affect the quantifiable property.

16. The system of claim 11, wherein the threshold is met by a corresponding acceptance parameter of a previously qualified supplier.

17. The system of claim 11, wherein the at least one part comprises an amount of raw materials.

18. The system of claim 11, wherein the plurality of batch effects further comprise batch effects produced by sampling the at least one part.

19. The system of claim 11, wherein the plurality of batch effects comprise: mill heat and heat treat lot.

20. The system of claim 11, wherein the quantifiable property comprises one of: hardness, tensile strength, weight, or dimension.

* * * * *